United States Patent [19]
Szigeti

[11] Patent Number: 6,113,179
[45] Date of Patent: Sep. 5, 2000

[54] VEHICLE SECURITY ENCLOSURE KIT

[76] Inventor: Josef Szigeti, 502 Avenida Lorenzo, Newport Beach, Calif. 92660

[21] Appl. No.: 09/302,128

[22] Filed: Apr. 29, 1999

[51] Int. Cl.$^7$ .................................. B60J 7/00; B60N 3/12
[52] U.S. Cl. ...................... 296/195; 296/37.16; 296/37.1
[58] Field of Search ............................... 296/37.16, 37.1, 296/195

[56] References Cited

U.S. PATENT DOCUMENTS

| | | |
|---|---|---|
| 4,198,091 | 4/1980 | Appelton ............................... 296/37.16 |
| 4,262,955 | 4/1981 | Duda . |
| 4,451,075 | 5/1984 | Canfield . |
| 4,480,675 | 11/1984 | Berkemeier . |
| 4,506,870 | 3/1985 | Penn . |
| 4,728,141 | 3/1988 | Motozawa et al. ................... 296/37.16 |
| 4,749,226 | 6/1988 | Heft . |
| 4,776,625 | 10/1988 | Lobanoff et al. . |
| 4,828,312 | 5/1989 | Kinkel et al. . |
| 4,938,519 | 7/1990 | Schlachter . |
| 5,011,208 | 4/1991 | Lewallen ............................... 296/37.16 |
| 5,037,154 | 8/1991 | Senba et al. ............................ 296/37.1 |
| 5,211,718 | 5/1993 | Gotz et al. ............................. 396/37.16 |
| 5,213,387 | 5/1993 | Decker et al. ........................ 296/37.16 |
| 5,224,748 | 7/1993 | Decker et al. ........................ 296/37.16 |
| 5,324,089 | 6/1994 | Schlachter . |
| 5,526,972 | 6/1996 | Frazier et al. .......................... 296/37.1 |
| 5,632,520 | 5/1997 | Butz ....................................... 296/37.1 |

*Primary Examiner*—Joseph D. Pape
*Assistant Examiner*—Kiran Patel
*Attorney, Agent, or Firm*—Roth & Goldman

[57] ABSTRACT

A vehicle security enclosure kit consists of a readily removable L-shaped storage area enclosure panel, mounting platforms and fasteners to connect the platforms to an open deck vehicle and fasteners to connect the panel to the platforms. When the panel is mounted, a security enclosure is created between the back seat, side walls, deck, and tailgate of the vehicle. The L-shaped storage area enclosure panel consists of a top horizontal panel and a bottom vertical panel. The horizontal panel is mounted onto the platforms and the vertical panel extends from the horizontal panel at an angle such that it is parallel to the back seat. The security enclosure can be easily removed upon release of wing nuts that are connected between the security enclosure and the side wall mount platform. In addition, since the mounting hardware is only accessible from within the security enclosure, screws and wing nuts can be used to connect the platforms to the side walls as well as the panels to the platforms. Thus no tools will be necessary for the removal or placement of the enclosure panel.

7 Claims, 3 Drawing Sheets

VEHICLE SECURITY ENCLOSURE KIT

CROSS REFERENCE TO RELATED APPLICATIONS, IF ANY

None

BACKGROUND OF THE INVENTION AND PRIOR ART

1. Field of the Invention

The present invention relates in general to security enclosures for use in open deck vehicles, such as Jeeps and others, which have an open storage space behind the back seat and in front of a hinged tailgate.

2. Prior Art

Currently there are numerous types of storage compartments that can be readily installed on an open deck vehicle. U.S. Pat. Nos. 4,938,519 and 5,324,089 each issued to Schlachter disclose L-shaped panels that fit between the back seat and the tailgate and which have a horizontally extending flange which rests atop the vehicle deck and a vertical flange which reaches to the vehicle's deck floor. These devices are permanently fastened to the vehicle side walls with a large number of horizontally extending sheet metal screws which must all be manipulated from beneath the security panel. Accordingly, these storage units are not readily removable. Furthermore, since the L-shaped panel rests on the top surface of the vehicle wheel wells rather than higher on top of the vehicle side walls, otherwise available secure storage compartment space above the top of the wheel wells is lost.

OBJECT OF THE INVENTION

The primary objective of the present invention is to provide an enclosure kit which maximizes the available secure space behind the back seat of an open vehicle.

Another objective of the present invention is to create an easily removable enclosure panel and a reasonably secure enclosed area between the back seat and tailgate of an open deck vehicle. Preferably, the removable panel should be easily portable and removable and one that creates an enclosed area behind the back seat of an open deck vehicle but allows for long items to be transported without removal of the system.

SUMMARY OF THE INVENTION

The present invention accordingly provides a vehicle security enclosure kit for a vehicle having a deck, side walls, back seat and tailgate defining an open storage area, said kit comprising:

(a) a rigid generally L-shaped storage area enclosure panel having a generally horizontally extending leg for covering said open storage area and a generally vertically extending leg for placement generally parallel to and proximate said back seat;

(b) a pair of mounting platforms each having a generally horizontally extending surface and first fastening means for attaching said platforms to a selected type of vehicle at opposite sides of said vehicle proximate said tailgate; and (c) second fastening means at each end of said panel for connecting said panel to said platforms, said second fastening means including hand grippable portions manipulatable only from within said storage area to attach or remove said enclosure panel from said platforms.

DESCRIPTION OF THE PREFERRED EMBODIMENTS

Figure 1:
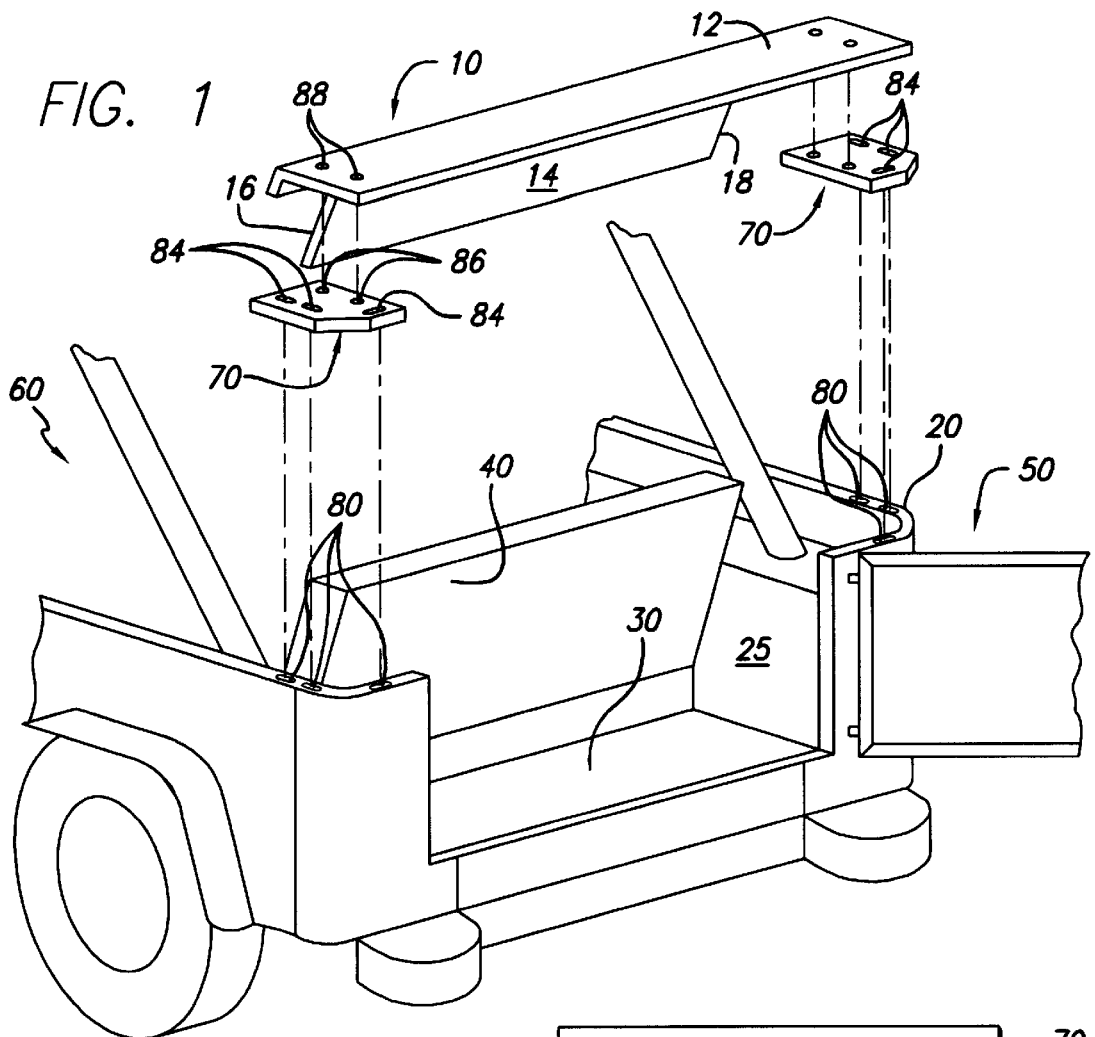
FIG. 1 is an exploded perspective view showing the rear portion of an open deck vehicle and placement of the vehicle security enclosure kit therein.

As shown in FIG. 1 behind the back seat 40 of the open deck vehicle 60 is an open space bounded on one side by the tailgate 50 when in the closed position, two side vehicle walls 20, wheel wells 25, a vehicle deck 30 and a back seat 40.

The vehicle security enclosure kit is comprised of a removable generally L-shaped storage area enclosure panel 10, a pair of mounting platforms 70 and associated fasteners to connect the mounting platforms 70 to the top of the vehicle side walls 20 and to connect the removable panel 10 to the mounting platforms 70.

The removable panel 10 is comprised of a horizontally extending leg 12 and a generally vertically extending leg 14. The length and width of the horizontal and vertical legs of the panel 10 is designed for the vehicle in which the kit is to be installed in such a manner that the leg 12 has a horizontal length to extend parallel to the deck 30 from closely adjacent the rear of the back seat to closely adjacent the tailgate when in closed position. The angle which the horizontal leg 12 makes with the generally vertical leg 14 will vary depending on the open deck vehicle for which the removable security enclosure kit is designed. In a Jeep for example, the vertically extending leg 14 is connected to the horizontally extending leg 12 to extend at approximately an 18° angle from the vertical. The generally vertically extending leg 14 extends parallel to the rear side of the back seat 40 of the open deck vehicle 60. It can be appreciated that the panel 10 may be formed by bending a single piece of metal into an L-shaped configuration or two separate panels defining the horizontally extending leg 12 and the vertically extending leg 12 can instead be welded together to form the L-shaped panel 10. The panel 10 may be manufactured out of metal or a strong light weight plastic material; i.e. any material that will provide the security required such that a thief could not easily remove or break through the material and which is light enough to be easily handled by a user of the open deck vehicle.

Figure 2:
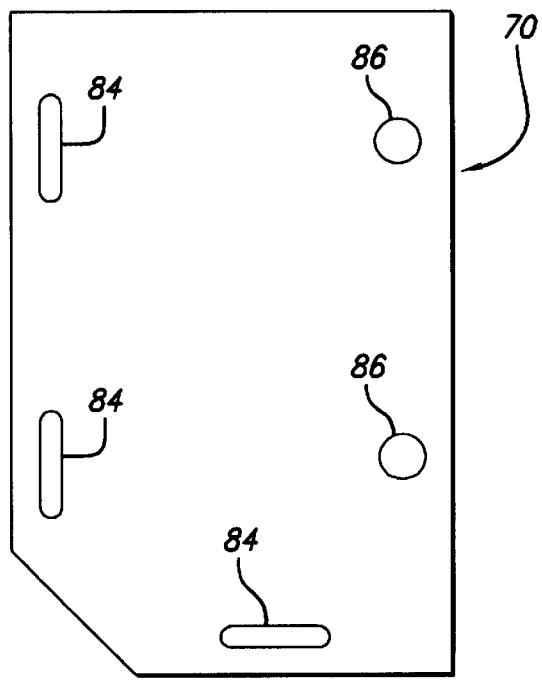
FIG. 2 is a top plan view of one of two mounting platforms, the other being a mirror image.
Figure 3:
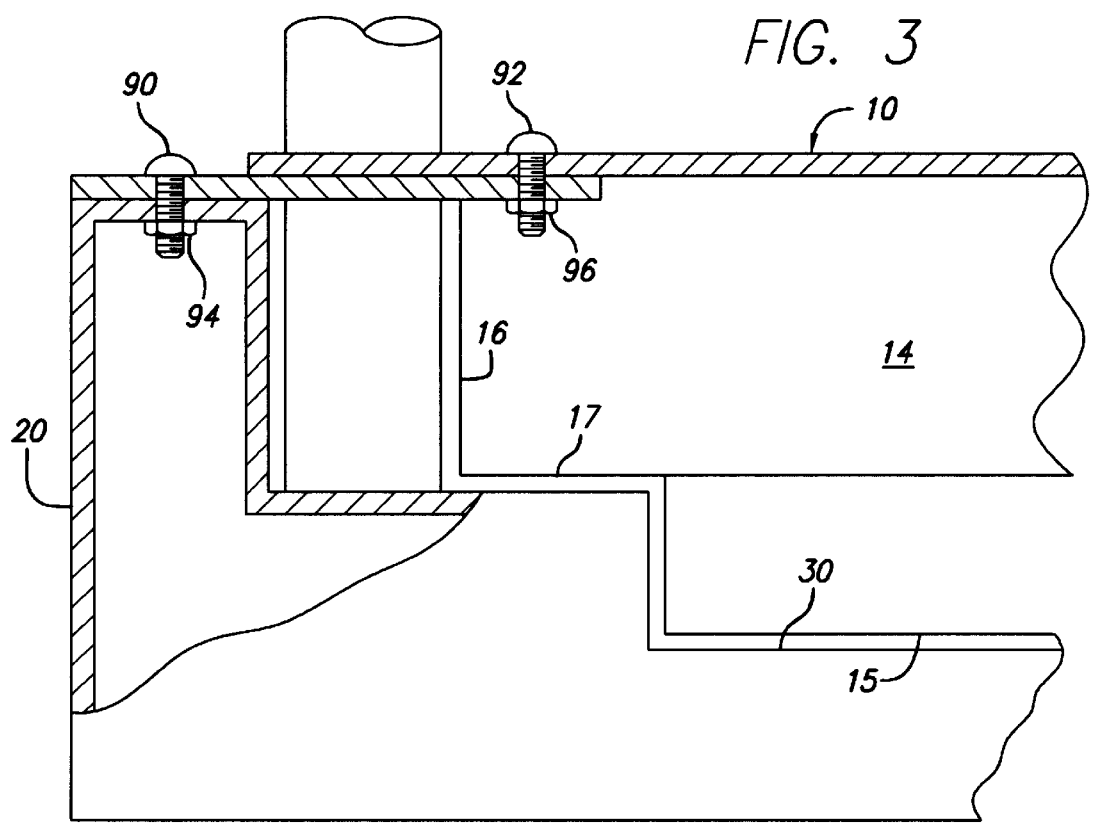
FIG. 3 is a rear elevation view, partially broken away of the vehicle security enclosure kit in installed position in a vehicle.
Figure 4:
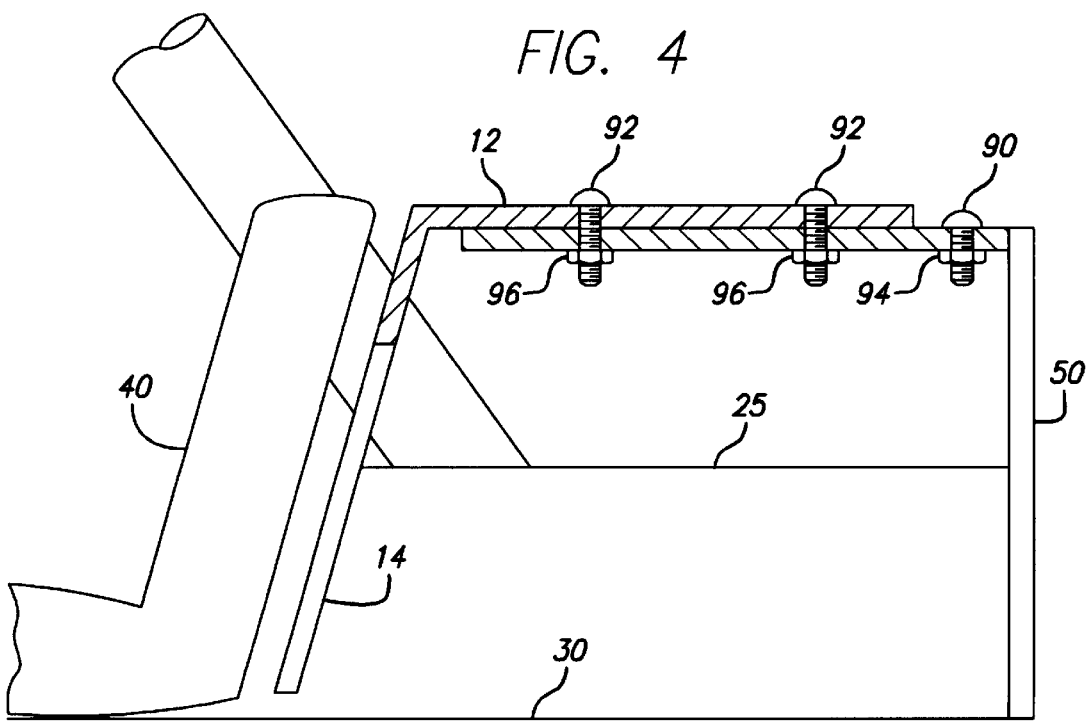
FIG. 4 is a side elevation view of the vehicle security enclosure kit in installed position in a vehicle.
Figure 5:
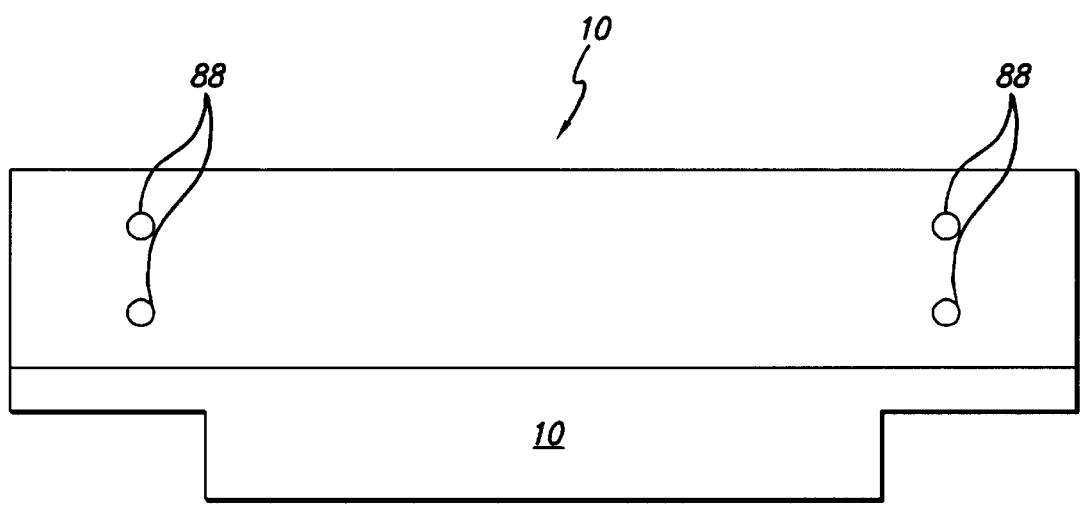
FIG. 5 is a plan view of one form of a removable security panel.

The kit including the mounting platforms and removable security panel 10 is installed in a vehicle having a rear deck 30 and wheel wells 25 as seen in FIGS. 1 and 3. The mounting platforms 70 are first attached to the upper edges of the side walls 20 of the vehicle. FIG. 2 shows the locations of elongated platform apertures 84 on the mounting platforms 70. In some vehicles side wall apertures 80 are factory made in the side walls 20 of the vehicle for use when attaching a soft top enclosure for the vehicle. These apertures may be used as well for the attachment of the mounting platforms. In other vehicles drilling may be necessary to create apertures in the upper edges of the vehicle side walls to attach the mounting platforms. The mounting platforms 70 are attached in the vehicle shown to the side walls 20. In other vehicle configurations not shown, the mounting platforms may be fastened to the vehicle by attachment to rollbar clamps or to the vehicle rollbars. In the arrangement shown, the platforms 70 are attached to the vehicle sidewalls such that the elongated platform apertures 84 in the mounting platforms 70 are in alignment with the apertures 80 in the vehicle side walls 20. Elongation of the apertures 84 is not essential but allows for slight misalignment with the factory made vehicle apertures. As shown in FIGS. 3 and 4, threaded platform fasteners 90 such as carriage bolts having a smooth rounded upper surface that is not grippable or removable from above are placed from above the mounting platforms 70 through the elongated platform apertures 84 then through the soft top cover holder apertures 80 in the vehicle side walls. Alternatively, the elongated fasteners can be permanently fastened, e.g. by welding, to the platforms 70 instead of using removable carriage bolts. Fastener nuts 94 are then placed from underneath the upper edges of the vehicle sidewalls 20 onto the fasteners 90 and tightened, preferably with a wrench. These platform fasteners 90 and nuts 94 are not readily removable without tools, but it can be appreciated that since the platform fastener nuts 94 are located underneath the security enclosure and not accessible when the tailgate 50 is in its locked position, easily removable hand grippable tightening hardware, i.e. wing nuts, can be used instead of nuts which are only grippable by a suitable tool.

The panel 10 is next affixed to the mounting platforms and has two circular panel apertures 88, as seen in FIG. 2 on each end of the horizontally extending leg 12 aligned with the circular platform apertures 86 on the mounting platforms 70. As shown in FIG. 3, panel fasteners 92 such as welded bolts or carriage bolts having a smooth rounded top surface not grippable from above are then placed through the circular panel apertures 88 on the top of the horizontally extending leg 12 and through the circular platform apertures 86 located on the mounting platforms 70. Easily removable hand grippable tightening hardware 96, i.e., wing nuts rather than hex nuts, are then placed onto the bottom of the panel fasteners 92 and tightened such that the panel 10 can not be removed from above.

When the panel 10 is securely connected to the mounting platforms 70 it can therefore only be removed from below, thus when the tailgate 50 is in its closed and locked position a thief can not reach the readily removable panel fastener wing nuts 96 since they all are enclosed within the security enclosure.

It will be noted from FIGS. 1 and 3 that the vertically extending leg 14 of panel 10 has shoulder ends 16, 18 that extend between the vehicle rollbars or, in some vehicles, all the way to the vehicle side walls 20 and lower horizontally extending shoulder edges 17 at each end that are closely proximate the upper surfaces of the wheel wells 25. The central portion of the vertically extending leg 14 has a lower edge 15 that terminates proximate the deck of the vehicle or a selected distance thereabove as shown in phantom in FIG. 3 to create a security enclosure when the tailgate 50 is in its locked position. If the lower edge 15 of the central portion of the panel leg 14 is spaced somewhat above the vehicle deck, when the panel 10 is in its mounted position, and the back seat 40 is either folded down or moved forward, long items can be placed lengthwise of the vehicle under the panel 10, thus still providing adequate use of the unsecured portion of the vehicle without having to remove the panel 10. In vehicles having a back seat 40 with a seat release mechanism that is accessible from in front of the back seat 40 it is preferred to design the kit such that the vertical leg 14 has a length to terminate adjacent the vehicle deck to prevent a thief from access to the security enclosure by merely moving the seat. However, in this configuration, storage area for long items as discussed above is sacrificed since these items would either have to be placed on top of the panel 10 or the panel 10 would have to be temporarily removed.

Persons skilled in the art will appreciate that various modifications of the preferred embodiment may be made without departing from the teachings herein and that the scope of protection is defined by the claims which follow.

What is claimed is:

1. A vehicle security enclosure kit for a vehicle having a deck, side walls, back seat and tailgate defining an open storage area, said kit comprising:

(a) a rigid generally L-shaped storage area enclosure panel having a generally horizontally extending leg for covering said open storage area and a generally vertically extending leg for placement generally parallel to and proximate said back seat;

(b) a pair of mounting platforms each having a generally horizontally extending surface and first fastening means for attaching said platforms to a selected type of vehicle at opposite sides of said vehicle proximate said tailgate; and (c) second fastening means at each end of said panel for connecting said panel to said platforms, said second fastening means including hand grippable portions manipulatable only from within said storage area to attach or remove said enclosure panel from said platforms.

2. The vehicle security enclosure kit of claim 1, wherein said generally horizontally extending leg of said panel is of generally rectangular configuration.

3. The vehicle security enclosure kit of claim 2, wherein said generally vertically extending leg of said panel includes a central portion of generally rectangular configuration.

4. The vehicle security enclosure kit of claim 3, wherein said central portion of said generally vertically extending leg of said panel abuts the deck of the vehicle when installed therein.

5. The vehicle security enclosure kit of claim 3, wherein said central portion of said generally vertically extending leg of said panel terminates above the deck of said vehicle when installed therein to leave a clearance space between said deck and said panel leg.

6. The vehicle security enclosure kit of claim 5, wherein said first fastening means comprise screws permanently affixed to said platforms at locations selected for extending through apertures in side walls of the vehicle and further comprising threaded locking fasteners receivable on said screws.

7. The vehicle security enclosure kit of claim 1, wherein said second fastening means comprise screws permanently affixed to said panel, said platforms having apertures therein aligned with said panel screws whereby said panel is removably attachable atop said platforms with said hand grippable portions of said second fastening means positioned below said platforms.

\* \* \* \* \*